United States Patent [19]
Irvine

[11] Patent Number: 5,904,026
[45] Date of Patent: May 18, 1999

[54] ADJUSTABLE HEIGHT FLIGHT

[75] Inventor: Gerald O. Irvine, Crosby, Minn.

[73] Assignee: Riverwood International Corporation, Atlanta, Ga.

[21] Appl. No.: 08/989,996

[22] Filed: Dec. 12, 1997

[51] Int. Cl.⁶ .................................................. B65B 35/30
[52] U.S. Cl. ............................... 53/201; 53/448; 53/534; 53/543; 198/473.1; 198/731; 198/803.11
[58] Field of Search .................................. 198/473.1, 731, 198/803.11; 53/201, 247, 251, 534, 543, 448

[56] References Cited

U.S. PATENT DOCUMENTS

| | | | |
|---|---|---|---|
| 5,188,217 | 2/1993 | Bruno | 198/473.1 X |
| 5,328,021 | 7/1994 | Calvert et al. | 198/731 X |
| 5,346,058 | 9/1994 | Santandrea et al. | 198/803.11 X |
| 5,347,788 | 9/1994 | Petz et al. | 53/201 X |
| 5,360,099 | 11/1994 | Culpepper et al. | 198/731 X |
| 5,369,942 | 12/1994 | Olson | 53/201 X |
| 5,392,896 | 2/1995 | Martelli | 198/473.1 |
| 5,546,734 | 8/1996 | Moncrief et al. | 53/534 |

Primary Examiner—Daniel B. Moon
Attorney, Agent, or Firm—Skinner and Associates; Steve McLary

[57] ABSTRACT

An adjustable height flight comprising a flight assembly and a cam mechanism. The flight assembly includes a flight base operationally connected to a rotational endless conveyance member, an adjustable flight bar slidably connected to the flight base, and an adjustment mechanism for adjusting and setting said flight bar at a desired height. The cam mechanism includes a cam frame, an adjustable cam track connected to the frame and operationally contacting the flight adjustment mechanism, a cam track adjustment mechanism attached to the frame and operationally contacting the cam track, and an engagement mechanism for selectively engaging and disengaging said cam mechanism from said flight assembly. The cam mechanism can be either engaged or disengaged from operational contact with the flight assembly. The cam track adjustment mechanism adjusts the position of the cam track to force the adjustable flight bar to a desired vertical position. The flight bar normally travels in a vertically locked position. The adjustment mechanism of the flight assembly engages both the button cam and the cam track in such a manner that the button cam unlocks the flight bar while the cam track adjusts the vertical position of the flight bar through the adjustment mechanism. The flight bar is locked again when the flight assembly travels off of the button cam.

21 Claims, 6 Drawing Sheets

ADJUSTABLE HEIGHT FLIGHT

BACKGROUND OF THE INVENTION

1. Field of the Invention

The present invention relates, generally, to apparatus and methods used in the packaging industry. The present invention provides particular benefits in high speed and continuous motion cartoners. More particularly, the invention relates to methods and apparatus used to select and divide a bulk flow of containers into properly configured groups for loading into cartons.

2. Background Information

Continuous motion cartoning machines typically receive a flood of containers and present a bulk flow of these containers to an article group selection and transportation mechanism. One type of article group selection and transportation mechanism includes a series of selector flights mounted to a rotary conveyance member at predetermined intervals. The flights intersect and divide the bulk flow of containers into properly configured groups by selecting or raking the leading containers from the bulk flow, forming groups in between adjacent flights, and guiding the containers as they are transported along with and to the side of a synchronized stream of cartons traveling on a carton transportation mechanism. Each configured group is cross-loaded from the article group selection and transportation mechanism into a carton traveling on the carton transport mechanism.

Each flight is typically in the shape of a bar and is designed to prevent the containers from tipping during the selecting, grouping, transporting and loading process described above. The flight preferably contacts the container at or near its composite center of percussion, which is dependent on the height of a particular container. The proper vertical position of each flight is especially important to stabilize containers undergoing quick acceleration and deceleration in a high speed cartoner, and to stabilize stacked groups of containers because the upper level groups are more apt to tip.

The state of the art for selecting, grouping, transporting and loading containers includes flight assemblies that either are non-adjustable or are adjustable through a slotted/bolt design. These devices and methods are believed to have significant limitations and shortcomings. Specifically, the non-adjustable flight assemblies are designed for and dedicated to one container height having a specific center of percussion. Product changeovers to process containers of other heights incur considerable expenses, including the cost to manufacture a new dedicated set of flight assemblies, and the downtime and labor required to remove the old set of flight assemblies and install the new set. Although the slotted/bolt type flight assemblies are adjustable, product changeovers still entail considerable downtime and labor to manually loosen each bolt with a tool, measure and adjust the height of each flight, and re-tighten each bolt.

Applicant's invention provides an improved adjustable height flight assembly which overcomes the limitations and shortcomings of the known art. Specifically, an operator can adjust an entire set of flight assemblies quickly and effectively through a few simple operations. Thus, an operator can use the present invention to accommodate different sized containers introduced in a product changeover. Therefore, the adjustable height flight of the present invention minimizes the cost, and the downtime and labor associated with product changeovers.

BRIEF SUMMARY OF THE INVENTION

The present invention provides an apparatus for automatically adjusting the height of an entire set of flights. The apparatus generally comprises a flight assembly for selecting and grouping containers and a cam mechanism for adjusting and setting the height of the flight assembly. The flight assembly includes a flight base attached to a flight chain or other endless conveyance member, an adjustable flight bar slidably connected either directly or indirectly to the flight base, and an adjustment mechanism for adjusting and setting the adjustable flight bar to the desired height. The cam mechanism includes a cam frame, a cam track rotatably connected to the cam frame and operationally positioned with respect to the flight adjustment mechanism, a cam track adjustment mechanism for changing the position and arrangement of the cam track to correspond to the desired height of the adjustable flight bar, and an engagement mechanism for selectively engaging and disengaging the cam mechanism from the flight assembly.

Significant features of the invention include the engagement mechanism for selectively engaging and disengaging the cam mechanism from the flight assembly, the adjustable cam track, and the adjustment mechanism for vertically adjusting and setting the flight assembly at a desired height.

The features, benefits and objects of this invention will become clear to those skilled in the art by reference to the following description, claims and drawings.

DETAILED DESCRIPTION

Figure 1:
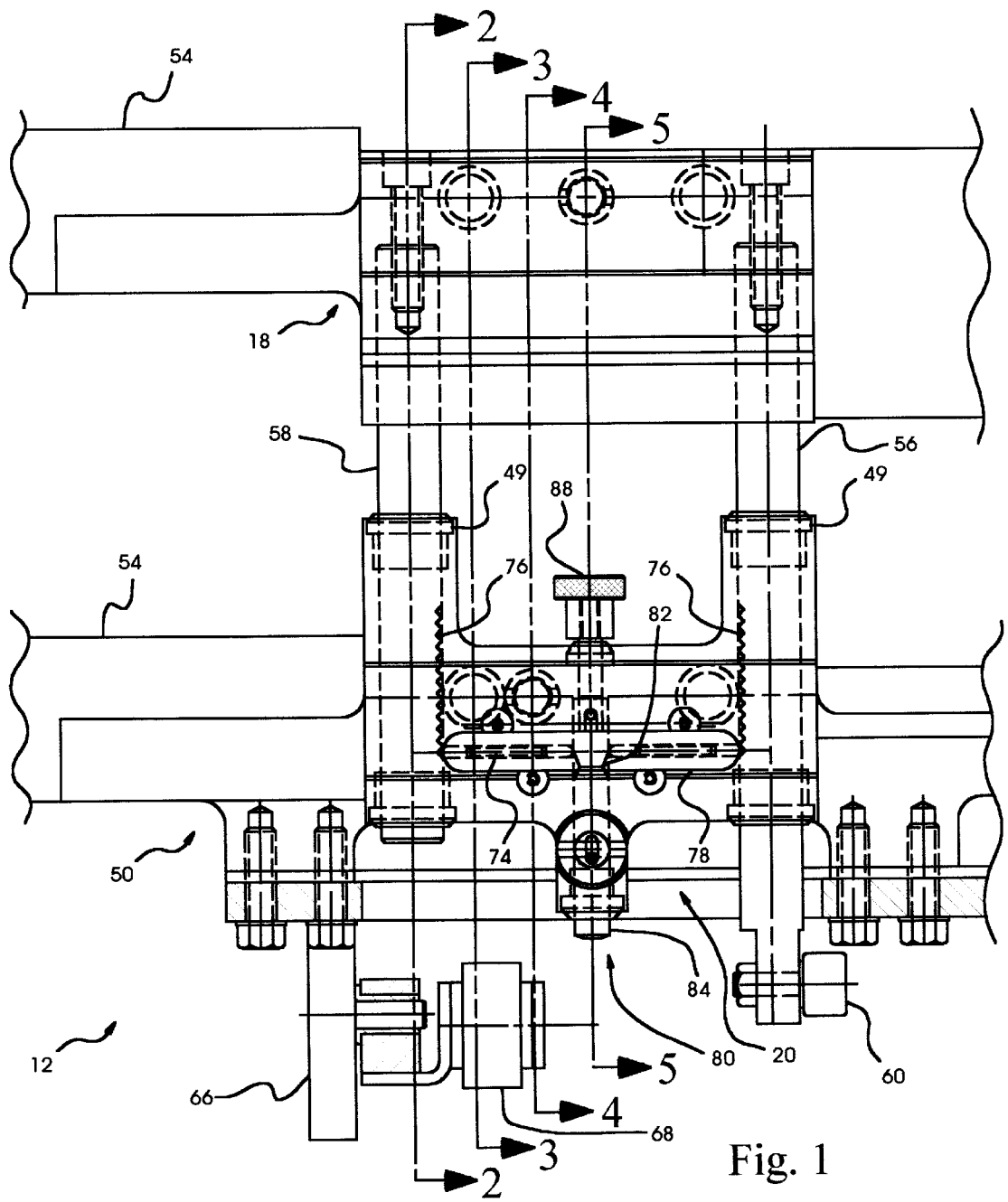
FIG. 1 is a front view of a flight assembly of the present invention.
Figure 3:
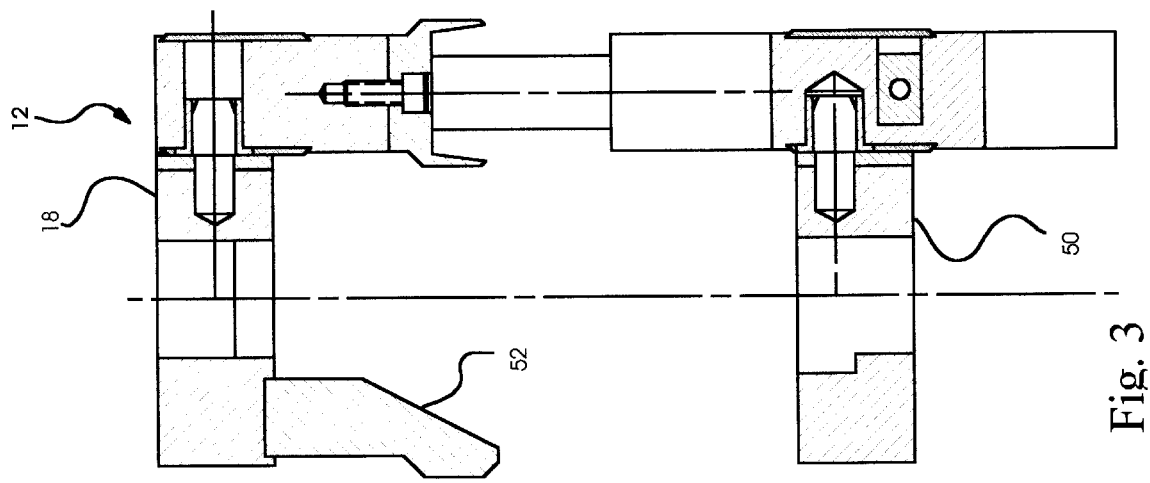
FIG. 3 is a cross-sectional view taken along line 3—3 of FIG. 1.

Referring to FIGS. 1–8, an example of the preferred embodiment of the present invention is illustrated and generally indicated by the reference numeral 10. The adjustable height flight is described below first in terms of its major structural elements and then in terms of its secondary structural and/or functional elements which cooperate to allow an operator to quickly and efficiently adjust the height of the set of flights during a product changeover. The present invention can be used to process a variety of container types and sizes, including aluminum cans, glass bottles, or plastic bottles, with only minor modifications to the components.

Figure 7:
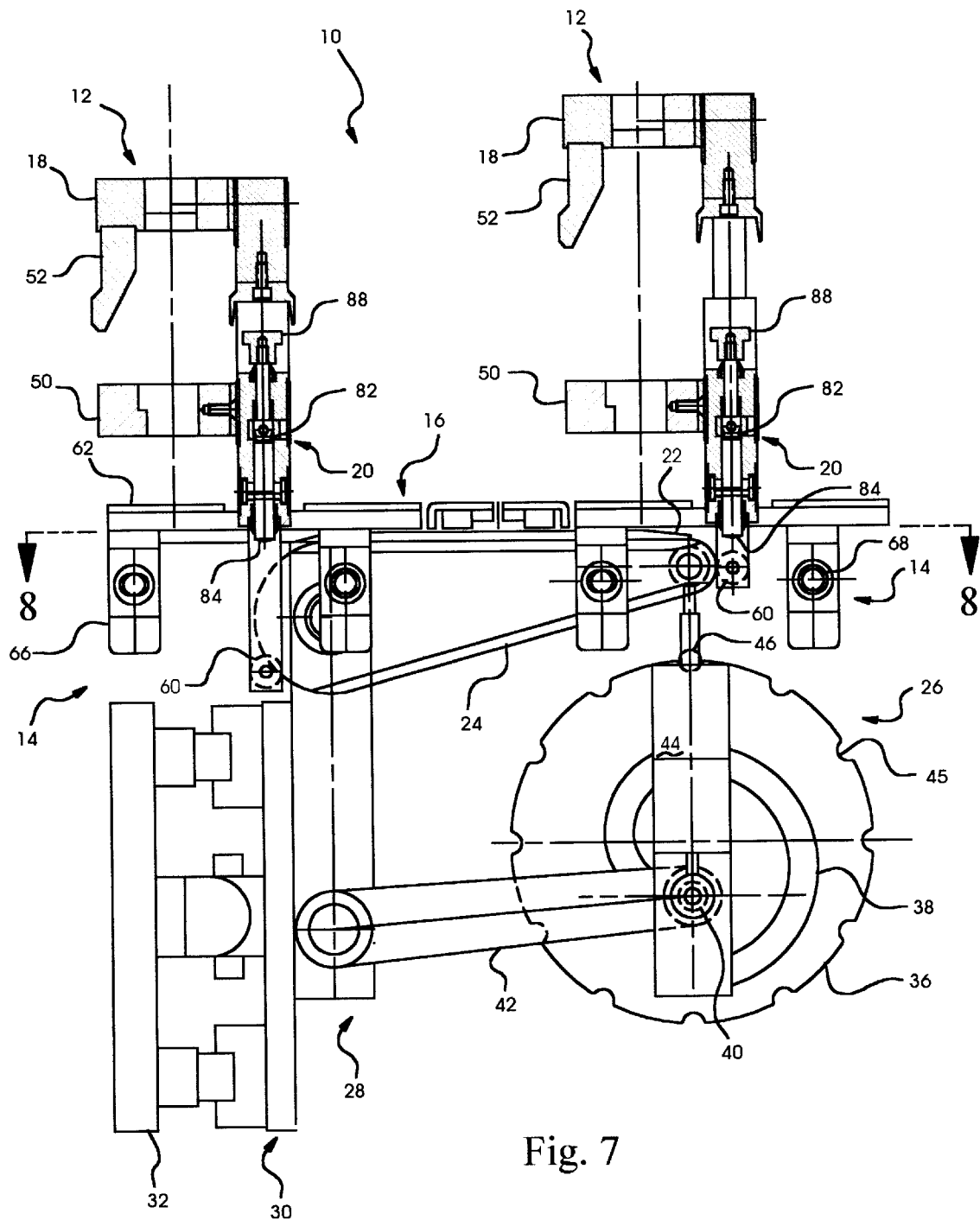
FIG. 7 is a cross-sectional view taken along line 7—7 of FIG. 6.
Figure 8:
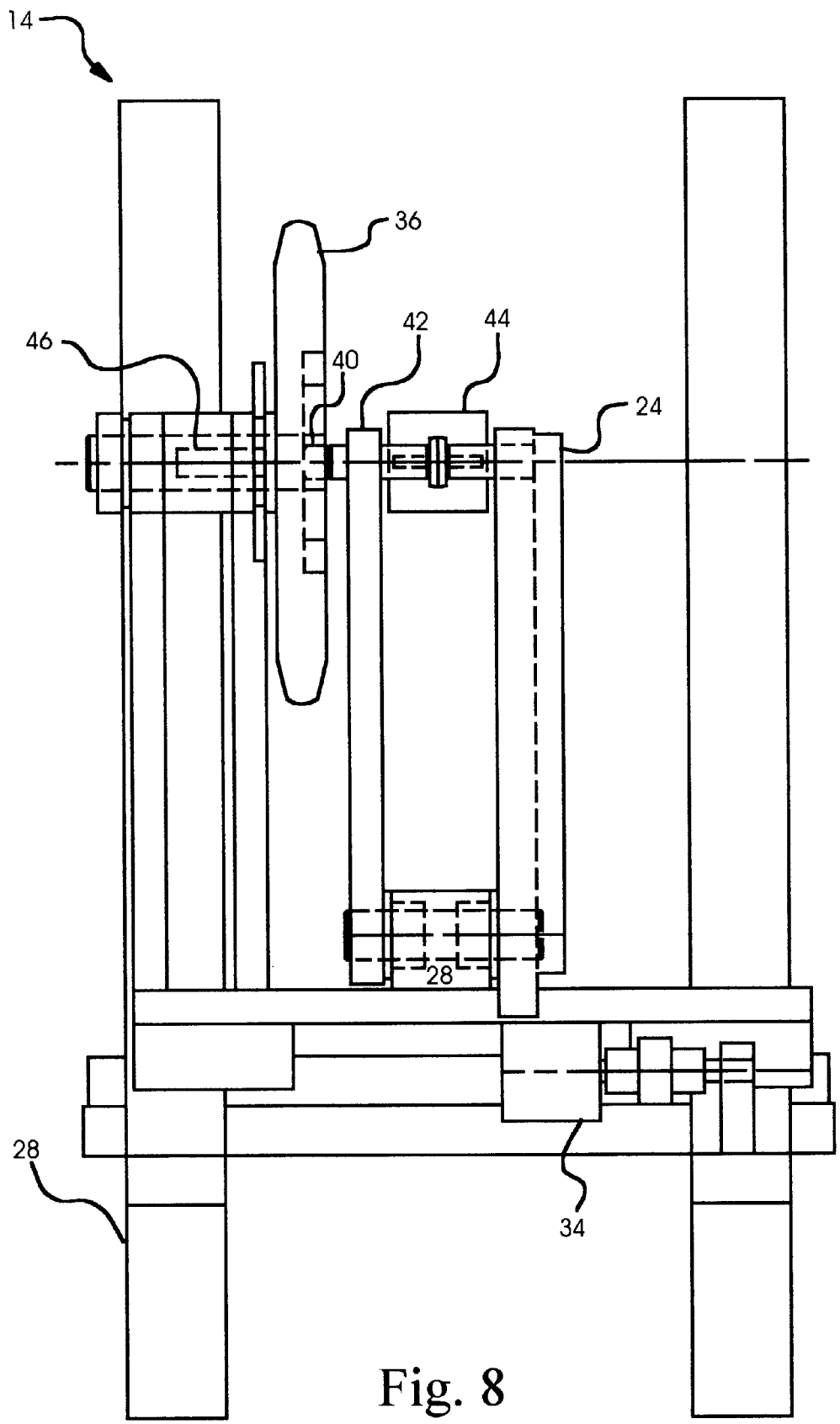
FIG. 8 is a cross-sectional view taken along line 8—8 of FIG. 7.

The operation of the adjustable height can flight 10 is illustrated in FIG. 7. The flight 10 is shown as a set of flight assemblies 12 traveling over and through a cam mechanism 14 which, if engaged with the flight assemblies 12, will induce the desired vertical adjustment in each flight assembly 12. In this particular illustration, the cam mechanism 14 raises a flight bar 18 in the flight assembly 12. Although the description and figures disclose a mechanism that produces vertical adjustments in the flight assemblies to accommodate containers of varying height, the mechanism could be adapted under the teachings of the present invention to produce horizontal adjustments in flight assemblies or lugs to accommodate containers of varying width.

Figure 2:
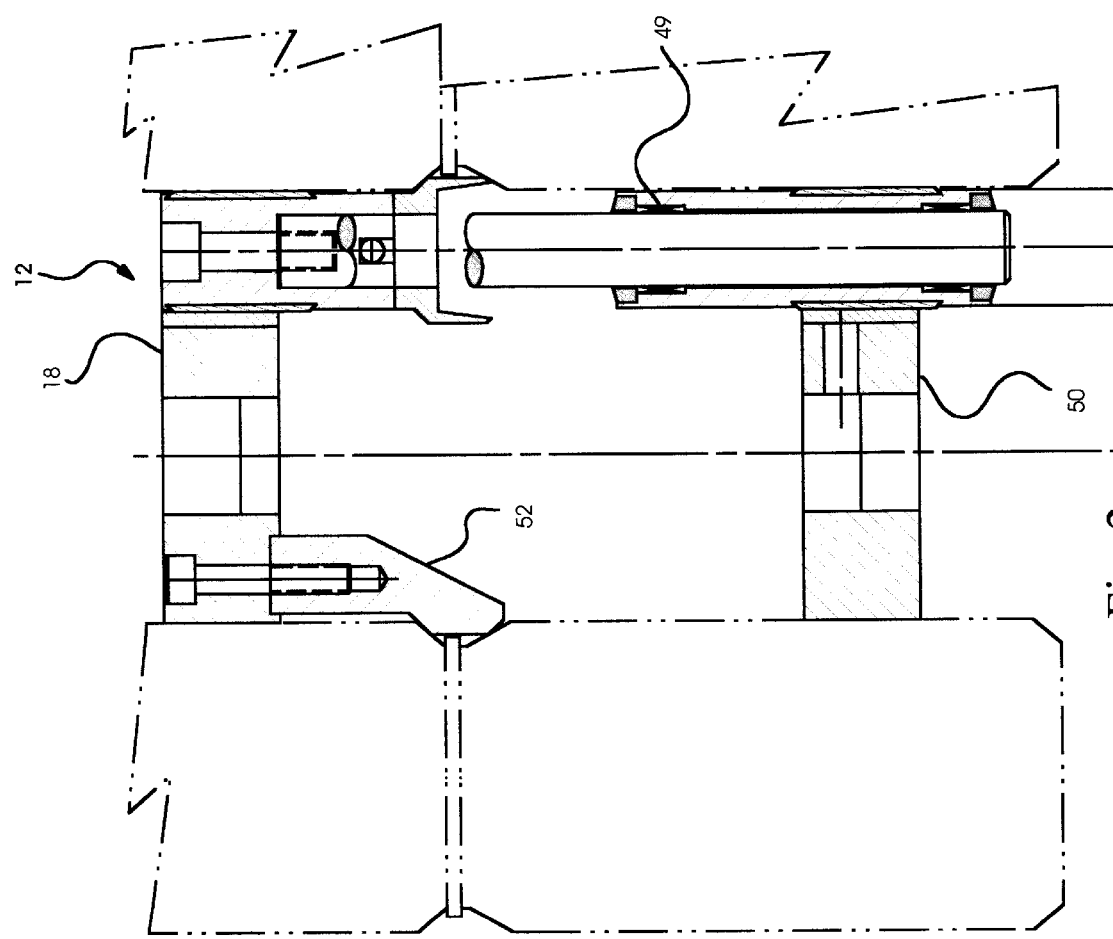
FIG. 2 is a cross-sectional view taken along line 2—2 of FIG. 1.
Figure 5:
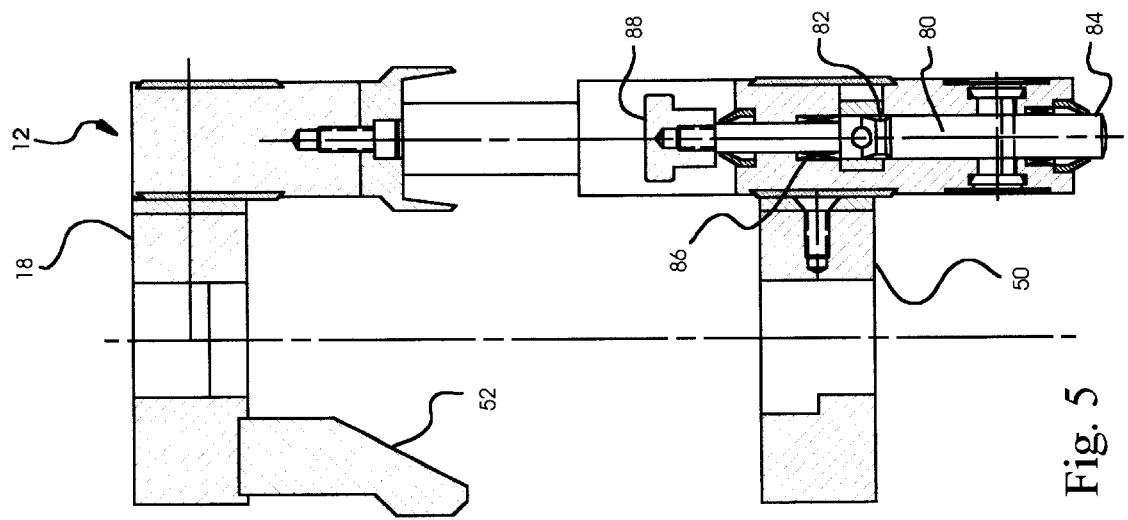
FIG. 5 is a cross-sectional view taken along line 5—5 of FIG. 1.
Figure 4:
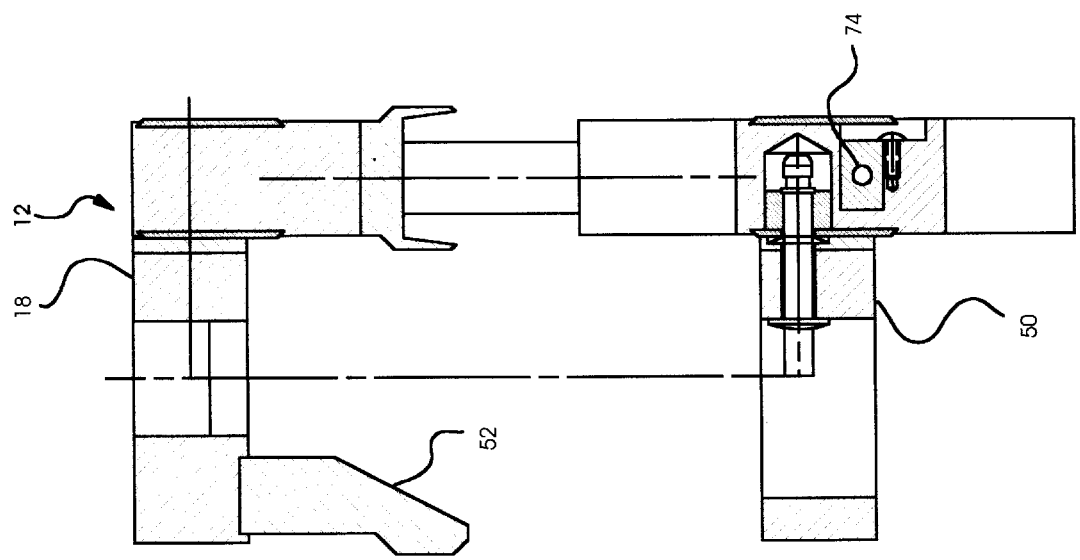
FIG. 4 is a cross-sectional view taken along line 4—4 of FIG. 1.

Referring to FIGS. 2–7, each flight assembly 12 has an adjustable flight bar 18 for contacting, separating, and transporting groups of containers and also has an adjustment mechanism 20 for vertically adjusting the height of the adjustable flight bar 18 and for setting the adjustable flight bar 18 in place by selectively locking and unlocking the adjustment mechanism 20. FIG. 2 shows the adjustable flight bar 18 contacting a stacked group of beverage cans. Each flight assembly 12 also has a flight base 16, which is attached to an endless conveyance member such as a flight chain (not shown). The adjustable flight bar 18 and the adjustment mechanism 20 are connected to the flight base 16 and are transported in a predetermined path with the flight chain.

Referring again to FIGS. 6–8, the cam mechanism 14 includes a button cam 22, a cam track 24, a cam track adjustment mechanism 26, a frame structure 28, and an engagement mechanism 30. The button cam 22, cam track 24, and cam track adjustment mechanism 26 are attached to the frame structure 28. The engagement mechanism 30 laterally moves the frame structure 28 with respect to the main frame 32 of a cartoning apparatus and flight assemblies 12, which moves the cam mechanism 14 into and out of operable contact with the set of the flight assemblies 12. When the cam mechanism 14 is engaged in operable contact with the flight assembly 12, the adjustment mechanism 20 of each flight assembly 12 interacts with the button cam 22 to unlock and lock the adjustable flight bar 18 at a vertical position, and also interacts with the cam track 24 to vertically adjust the adjustable flight bar 18 when it is unlocked. The cam track adjustment mechanism 26 moves the cam track 24 into a position and arrangement that will raise or lower the adjustable flight bar 18 to a desired vertical height.

Figure 6:
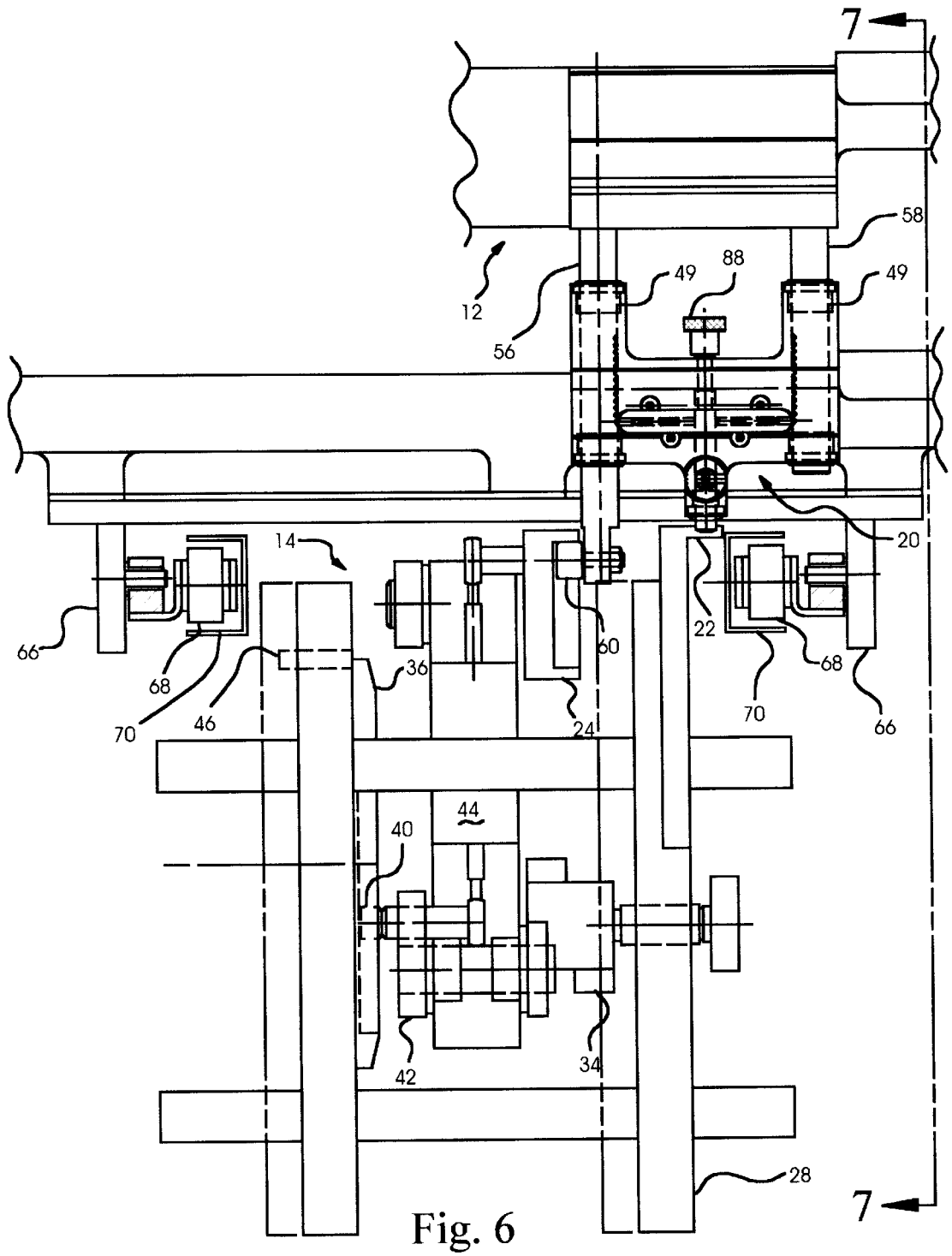
FIG. 6 is a front view of the cam mechanism and a partial view of the flight assembly.

In a preferred embodiment of the cam mechanism 14, the engagement mechanism 30 includes linear bearings (not shown) in between the frame structure 28 and the main frame 32 of the cartoner. The engagement mechanism 30 also includes an air cylinder 34, shown in FIG. 6, positioned and arranged to move the cam mechanism 14 into and out of operable contact with the adjustment mechanism 20 of each flight assembly 12 as it travels through the cam mechanism 14. FIG. 6 shows the cam mechanism 14 engaged with the flight assembly 12 and also illustrates the lateral displacement of the frame structure 28 in a disengaged position. The cam track 24 and button cam 22 are attached to the frame structure 28 and would likewise be laterally moved into a disengaged position.

The cam track adjustment mechanism 26 uses a hand wheel 36 as a user interface. Referring to FIG. 7, the hand wheel 36 has a spiral cam track 38 sized to cooperate with a spiral cam follower 40 located on a handle end of an arm 42 that is rotatably mounted onto the frame structure 28. Turning the hand wheel 36 causes the spiral cam follower 40 to either move out toward the circumference of the hand wheel 36 or in toward its center, and thus causes the arm 42 to rotate. Moving the arm 42 activates a rotatably connected back-to-back air cylinder 44. The back-to back air cylinder 44 normally extends one cylinder while the other is retracted. Specifically, the air cylinder 44 will push the cam track 24 up when the spiral cam follower 40 and arm 42 are moved in toward the center of the hand wheel 26, and will pull the cam track 24 down when the spiral cam follower 40 and arm 42 are moved out toward the circumference of the hand wheel 26. The air cylinder 44 senses jams when an air cylinder is moved against air pressure. In the event of a jam, the air cylinder 44 will actuate a switch to stop motion in the machine and will signal the operator. In order to rotate the hand wheel 26 to raise the adjustable flight bar for a desired container height, marks on the surface of the hand wheel 26 can be aligned with a pointer item. In addition, a spring biased ball detent or another latching device can be used to provide a positive mechanical position reference. The circumference of the hand wheel 26 also has a plurality of notches 45 corresponding to the shape of a locking pin 46 that is attached to the main frame 32 of the cartoner. The locking pin 46 is positioned to engage one of these notches and lock the hand wheel 26 when the cam mechanism 14 is laterally disengaged away from the flight assembly 12, but to disengage from these notches and free the hand wheel 26 to rotate and make adjustments when the cam mechanism 14 is laterally engaged with the flight assemblies 12.

Referring again to FIG. 7, the cam track 24 has a shape to receive the cam follower 60 in a variety of vertical positions and funnel the cam follower 60 to a new desired vertical position. The preferred embodiment shows the cam track 24 rotatably connected to a frame structure 28. It is anticipated that the cam track 24 can be integrated into the cam mechanism 14 in other ways and can undertake other shapes while still raising and lowering the height of the adjustable flight bars 18. The cam track 24 and the arm 42 of the cam track adjustment mechanism 26 are rotatably mounted to the frame structure 28, and the button cam 22 and the back-to-back air cylinder 44 of the cam track adjustment mechanism 26 are rigidly attached to the frame structure 28. Thus, the engagement mechanism 30 is able to engage and disengage the cam track 24, the button cam 22, and the cam track adjustment mechanism 26 by laterally moving the frame structure 28.

A preferred embodiment of the flight assembly 12 includes an adjustable or upper flight bar 18, a lower flight bar 50, and a divider pad retainer 52 for holding a divider sheet in place while an upper group of containers is loaded onto a lower group. Each of the flight bars 18 and 50 have a wedge 54 attached to the leading edge that makes first contact with the bulk flow of containers. The wedge 54 is designed to assist with the selection, separation, and grouping function of the flights 10 without damaging the containers.

As shown in FIGS. 1–2 and 6–7, the adjustable flight bar 18 is attached to vertical shafts 56 and 58, which are slidably or telescopically connected through sleeve bearings 49 to the lower flight bar 50, which is attached to the flight base 16. It is anticipated that the upper flight bar 18 could be directly connected to the flight base 50 rather than being indirectly connected through the lower flight bar 50. Thus, the lower flight bar 50 could be removed for container types. Rod wipers are mounted outside of the sleeve bearings 49 to prevent contaminants from entering the sleeve bearings 49 and interfering with the telescopic motion.

The shafts 56 and 58 form part of the adjustment mechanism 20. One of the shafts is a long vertical shaft 56 which extends below the flight base 16. The other shaft is a short vertical shaft 58 which is terminated within the lower flight bar 50. A cam follower 60 is attached to the long vertical shaft 56 below the flight base 16. The cam follower 60 is positioned and arranged to engage the cam track 24 when the cam mechanism 14 is engaged. Thus, the cam track 24 can vertically move the cam follower 60 and the long vertical shaft 56 to produce vertical motion in the adjustable flight bar 18.

The adjustment mechanism 20 performs two major functions: the long vertical shaft 56 and cam follower 60 cooperate with the cam track 24 to vertically adjust the adjustable flight bar 18; and a ball end shuttle 74 sets the upper flight bar 18 in a desired vertical position by locking or latching the vertical shafts 56 and 58 in a desired position. The ball end shuttle 74 has an extended position in which it engages opposing sockets 76 in the vertical shafts 56 and 58 and latches the shafts in a vertical position, and the shuttle 74 has a retracted position in which it releases from the opposing sockets 76 and frees the shafts 56 and 58. The ball end shuttle 74 functions in a bronze shuttle housing 78 located in a cavity or throughbore within the lower flight bar 50.

A relatively vertical plunger rod 80 extends from the shuttle housing 78 through a bore in the lower flight bar 50 and through the flight base 16. The plunger rod 80 has a ramp portion 82 located in the shuttle housing 78 and a button end 84 located below the flight base 16. The plunger rod 80 is moveable between an up position and a down position. The ramp portion 82 is configured to extend the ball end shuttle 74 and latch the shafts 56 and 58 when the ramp portion 82 is in the down position and to allow the ball end shuttle 74 to retract out of the sockets 76 and release the shafts 56 and 58 when the plunger rod 80 is in the up position. A compression spring 86 biases the plunger rod in the down position and thus normally extends the shuttle 74 and latches the shafts 56 and 58 and locks the adjustable flight bar 18 in position. A spring pin within a slotted opening is used to retain the plunger rod 80 in the lower flight bar 50. Caplugs are used to prevent contaminants from entering the slotted opening and rod wipers are used to prevent contaminants from entering the bore in the lower flight bar 50.

When the cam mechanism 14 is engaged, the button cam 22 is positioned in the flight path of the plunger rod 80 and forces the rod 80 up and unlatches the shafts 56 and 58 when the flight assembly 12 travels over the cam mechanism 14. Therefore, when the cam mechanism 14 is engaged, the adjustment mechanism 20 unlocks the adjustable flight bar 18 and allows it to undergo vertical motion. The cam follower 60 engages the cam track 24, which is set to its desired position using the hand wheel 36, and forces the long shaft 56, the short shaft 58, and the adjustable flight bar 18 into the desired vertical position. A knurled knob 88 connected to the top end of the plunger rod 80 and is used to manually raise the plunger rod 80 and unlock the mechanism if it malfunctions or if maintenance is required.

The flight base 16 includes a plurality of flight pads 62, mounting blocks, or other deadplate-like surfaces disposed between each flight assembly 12 over which the containers glide during the selecting, grouping and loading of containers. The flight base 16 also has flight blocks 66, including flight cam followers 68 for engaging a flight track 70 and means for attaching the flight blocks 66 to a flight chain or other rotating endless conveyance member (not shown).

The adjustable height flight 10 of the present invention automates the necessary or desirable vertical adjustments for each flight assembly for a product changeover. During normal operation, the flight assemblies 12 are locked in a preset position based on the height of the containers currently being processed. An operator performs the following steps for a product changeover:

(1) Stop the machine at a "time stop" position which is a position where the cam mechanism 14 can move laterally without interference from the flight assemblies 12.

(2) Activate the air cylinder 34 of the engagement mechanism 30 to move the cam mechanism 14 into the travel path of the flight assemblies 12.

(3) Adjust the hand wheel 36 to the new selected height for the new product.

(4) Cycle, or jog, the machine to cause at least one pass of all flight assemblies 12 through the cam mechanism 14.

(5) Stop the machine at a "time stop."

(6) Retract the cam mechanism 14 using the air cylinder 34.

(7) Resume operations.

During each pass of a flight assembly through the cam mechanism, the adjustment mechanism is unlocked, the vertical height of the adjustable flight bar is adjusted, and the adjustment member is locked again. Thus, the present invention provides a simple means for adjusting the height of the flight for a product changeover.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. An adjustable flight, comprising:
   (a) a flight assembly including:
      (1) a flight base operationally connected to a conveyance member;
      (2) an adjustable flight member slidably connected to said flight base; and
      (3) an adjustment mechanism for setting said flight member at a desired position with respect to said flight base; and
   (b) a cam mechanism including:
      (1) a cam frame;
      (2) a cam track connected to said frame, said cam track operationally contacting said flight adjustment mechanism; and
      (3) a cam track adjustment mechanism for moving said cam track with respect to said cam frame, said cam track adjustment mechanism being attached to said cam frame and operationally connected to said cam track.

2. The adjustable flight of claim 1, wherein said flight assembly further includes a lower flight bar attached to said flight base.

3. The adjustable flight of claim 2, wherein said flight assembly further includes two shafts, each of said shafts being attached to said adjustable flight member and telescopically connected to said lower flight bar.

4. The adjustable flight of claim 1, wherein said adjustment mechanism of said flight assembly includes a vertical adjustment mechanism and a locking mechanism for setting and locking said adjustable flight member at said desired position with respect to said flight base.

5. The adjustable flight of claim 4, wherein said vertical adjustment mechanism includes a long vertical shaft and a short vertical shaft, each of said shafts being attached to said adjustable flight member, said long vertical shaft extending below said flight base, wherein said vertical adjustment mechanism further includes a cam follower attached to said long vertical shaft below said flight base, and wherein, when said cam mechanism engages said flight assembly, said cam follower contacts said cam track and vertically adjusts said long vertical shaft and said adjustable flight member.

6. The adjustable flight of claim 4, wherein said vertical adjustment mechanism includes two vertical shafts, each of said shafts being attached to said adjustable flight member, wherein said locking mechanism includes a plunger rod having an upward and a downward position in operational contact with a ball end shuttle having a retracted and an extended position, both said plunger rod and said ball end shuttle being located in a lower flight bar, whereby said shuttle extends to the extended position when said plunger rod is in the downward position and retracts when said plunger rod is in the upward position, and whereby said shuttle latches with said vertical shafts in the extended position and unlatches with said vertical shafts in the retracted position, wherein said cam mechanism further includes a button cam attached to said cam frame, and wherein said button cam contacts a button end and forces said plunger rod to said upward position to unlock said adjustable flight member when said flight assembly travels through said cam mechanism.

7. The adjustable flight of claim 6, wherein said locking mechanism includes a plurality of sockets located in said shafts, whereby said ball end shuttle latches with said vertical shafts by extending into said sockets.

8. The adjustable flight of claim 6, wherein said locking mechanism further includes a compression spring, wherein said spring biases said plunger rod in the downward position and causes said ball end shuttle to extend and latch with said shafts.

9. The adjustable flight of claim 8, wherein said locking mechanism further includes a knob attached to said plunger rod, and wherein turning said knob lifts said plunger rod to the upward position and unlatches said ball end shuttles from said vertical shafts.

10. The adjustable flight of claim 8, wherein said locking mechanism further includes a compression pin positioned and arranged to maintain said plunger rod in an operable position.

11. The adjustable flight of claim 1, wherein said cam mechanism further includes an engagement mechanism for selectively engaging and disengaging said cam mechanism from said flight assembly.

12. The adjustable flight of claim 11, wherein said engagement mechanism includes a plurality linear bearings operationally contacting said cam frame and a frame structure of a cartoning apparatus and means for laterally moving said cam frame.

13. The adjustable flight of claim 12, wherein said means for laterally moving said frame includes an air cylinder.

14. The adjustable flight of claim 1, wherein said cam track adjustment mechanism includes an arm and an air cylinder, said arm having a pivot end and a handle end, said arm being rotatably connected to said cam mechanism frame at said pivot end and being operably connected to said air cylinder at said handle end, and wherein moving said arm actuates said air cylinder and moves said cam track.

15. The adjustable flight of claim 14, wherein said cam track adjustment mechanism further includes a hand wheel having a spiral cam track, wherein said arm has a cam follower attached to said handle end, wherein said cam follower engages said spiral cam track, and wherein moving said hand wheel moves said arm and actuates said air cylinder.

16. The adjustable flight of claim 15, wherein said cam track adjustment mechanism further includes a visible pointer and a ball detent for measuring the position of said hand wheel and the position of said cam track.

17. The adjustable flight of claim 1, wherein a series of said adjustable flights are used in a packaging machine of the type having an article group selection and transportation mechanism and a carton transport mechanism, wherein said series of said adjustable flights intersect and divide a bulk flow of containers into properly configured groups of containers, wherein a stream of cartons are transported on said carton transport mechanism, and wherein said groups of containers are cross-loaded from said article group selection and transportation mechanism into a carton traveling on said carton transport mechanism.

18. An adjustable height flight, comprising:
  (a) a flight assembly including:
    (1) a flight base operationally connected to a rotational endless conveyance member;
    (2) an adjustable flight member; and
    (3) a flight adjustment mechanism for setting said flight member at a desired position with respect to said flight base, said flight adjustment mechanism including a vertical adjustment mechanism and a locking mechanism, said vertical adjustment mechanism including a long vertical shaft and a short vertical shaft, each of said shafts being attached to said adjustable flight member and being telescopically connected to said flight base, said long vertical shaft extending below said flight base; and
  (b) a cam mechanism including:
    (1) a cam frame;
    (2) a cam track pivotally connected to said frame and operationally contacting a cam follower of said flight adjustment mechanism;
    (3) a cam track adjustment mechanism attached to said cam frame and operationally contacting said cam track, said cam track adjustment mechanism including an arm and an air cylinder, said arm having a pivot end and a handle end, said arm being rotatably connected to said cam mechanism frame at said pivot end and being operably connected to said air cylinder at said handle end, wherein moving said arm actuates said air cylinder and moves said cam track; and
    (4) an engagement mechanism for selectively engaging and disengaging said cam mechanism with said flight assembly.

19. An adjustable height flight for a packaging machine of the type having an article group selection and transportation mechanism and a carton transport mechanism, wherein the article group selection and transportation mechanism includes a set of said adjustable height flights for intersecting and dividing a bulk flow of containers into properly configured groups of containers, wherein a stream of cartons are transported on the carton transport mechanism, and wherein the groups of containers are cross-loaded from the article group selection and transportation mechanism into a carton traveling on the carton transport mechanism, said adjustable height flight comprising:
  (a) a flight assembly including:
    (1) a flight base operationally connected to a rotational endless conveyance member;
    (2) an adjustable flight member telescopically attached with said flight base;
    (3) an adjustment mechanism for setting and locking said adjustable flight member at a desired height, said flight adjustment mechanism including a vertical adjustment mechanism and a locking mechanism, said vertical adjustment mechanism including:
  (a) a long vertical shaft and a short vertical shaft, each of said shafts being attached to said adjustable flight member and being telescopically connected to said flight base, said long vertical shaft extending below said flight base; and
  (b) a cam follower attached to said long vertical shaft below said flight base;
said locking mechanism including:
  (a) a ball-end shuttle having a retracted and an extended position; and
  (b) a plunger rod having an upward and a downward position in operational contact with said shuttle;
  whereby said shuttle extends when said plunger rod is in the upward position and retracts when said plunger rod is in the downward position, and whereby said shuttle latches with said long and short vertical shafts in the extended position and unlatches with said long and short vertical shafts in the retracted position;
(b) a cam mechanism including:
  (1) a cam frame;
  (2) a cam track pivotally connected to said frame and operationally contacting said cam follower of said flight adjustment mechanism;
  (3) a cam track adjustment mechanism attached to said cam frame and operationally contacting said cam track, said cam track adjustment mechanism including an arm and an air cylinder, said arm having a pivot end and a handle end, said arm being rotatably connected to said cam mechanism frame at said pivot end and being operably connected to said air cylinder at said handle end, wherein moving said arm actuates said air cylinder and moves said cam track;
  (4) an engagement mechanism for selectively engaging and disengaging said cam mechanism with said flight assembly, said engagement mechanism including a plurality of linear bearings operationally contacting said cam frame and a frame structure of a cartoning apparatus and means for laterally moving said cam frame into and out of contact with said flight assembly; and
  (5) a button cam attached to said cam frame, wherein said button cam is positioned and arranged to contact and force said plunger rod to said upward position and unlock said adjustable flight member when said flight assembly passes over said button cam and when said engagement mechanism engages with said flight assembly.

20. A method for automatically adjusting a plurality of flight assemblies attached to a rotational endless conveyance member of a cartoning apparatus, the cartoning apparatus having a cam mechanism, the cam mechanism having a cam track for adjusting the vertical height of each flight assembly traveling through the cam mechanism, the flight assemblies having a predetermined path through the cam mechanism, each of the flight assemblies having an adjustable flight member, an adjustment mechanism, and a cam follower, said method comprising the steps of:
  (a) engaging the cam mechanism into operational position with respect to the path of the flight assemblies;
  (b) adjusting the cam track to correspond with a desired height for the flight assemblies;
  (c) unlocking the adjustment mechanism in each of the flight assemblies;
  (d) adjusting the flight member in each of the flight assemblies through the interaction of the cam track with the cam follower on each of said flight assemblies;
  (e) locking the flight adjustment mechanism in each of the flight assemblies; and
  (f) disengaging said cam mechanism out of operational position with respect to the flight assemblies.

21. The method of claim 20, wherein said cam mechanism further includes a button cam and said flight adjustment mechanism further includes a plunger rod in operational contact with a ball end shuttle,
  wherein said step of unlocking includes the step of moving the plunger rod into contact with the button cam, wherein the button cam pushes said plunger rod to an upward position and retracts the ball end shuttle to unlock the adjustment mechanism, and
  wherein said step of locking includes the step of moving the plunger rod out of contact with the button cam, wherein the plunger rod is biased in a downward position and extends the ball end shuttle to lock the adjustment mechanism.

* * * * *